United States Patent
Tamura

(10) Patent No.: US 8,048,495 B2
(45) Date of Patent: Nov. 1, 2011

(54) CHOLESTERIC LIQUID CRYSTAL COMPOSITION, CIRCULAR POLARIZATION SEPARATOR SHEET AND USE THEREOF

(75) Inventor: Kentaro Tamura, Tokyo (JP)

(73) Assignee: Zeon Corporation, Tokyo (JP)

( * ) Notice: Subject to any disclaimer, the term of this patent is extended or adjusted under 35 U.S.C. 154(b) by 237 days.

(21) Appl. No.: 12/303,493

(22) PCT Filed: Jun. 4, 2007

(86) PCT No.: PCT/JP2007/061319
§ 371 (c)(1),
(2), (4) Date: Dec. 4, 2008

(87) PCT Pub. No.: WO2007/142206
PCT Pub. Date: Dec. 13, 2007

(65) Prior Publication Data
US 2009/0117292 A1    May 7, 2009

(30) Foreign Application Priority Data

Jun. 5, 2006 (JP) .................................. 2006-156514
Apr. 27, 2007 (JP) .................................. 2007-119522

(51) Int. Cl.
C09K 19/00 (2006.01)
C09K 19/06 (2006.01)
C09K 19/52 (2006.01)
G02F 1/13 (2006.01)
G02F 1/1333 (2006.01)

(52) U.S. Cl. .................. 428/1.1; 252/299.01; 252/299.6; 252/299.68; 430/20; 427/163.2

(58) Field of Classification Search .............. 252/299.01, 252/299.6, 299.68; 428/1.1; 430/20; 427/163.2
See application file for complete search history.

(56) References Cited

U.S. PATENT DOCUMENTS

| | | | |
|---|---|---|---|
| 6,010,642 A * | 1/2000 | Takatsu et al. ............. | 252/299.6 |
| 6,417,902 B1 | 7/2002 | Greenfield et al. | |
| 2005/0045854 A1 | 3/2005 | Radcliffe et al. | |
| 2005/0224754 A1 | 10/2005 | Hirai et al. | |

FOREIGN PATENT DOCUMENTS

| | | |
|---|---|---|
| JP | 8-3111 A | 1/1996 |
| JP | 8-41461 A | 2/1996 |
| JP | 2000-96063 A | 4/2000 |
| JP | 2000-281629 A | 10/2000 |
| JP | 2001-66431 A | 3/2001 |
| JP | 2001-100045 A | 4/2001 |
| JP | 2004-182678 A | 7/2004 |
| JP | 2004-182702 A | 7/2004 |
| JP | 2005-37657 A | 2/2005 |
| JP | 2005-91825 A | 4/2005 |
| JP | 3677632 B2 | 5/2005 |
| JP | 2006-64758 A | 3/2006 |
| JP | 2007-65314 A | 3/2007 |
| JP | 2007-79496 A | 3/2007 |
| JP | 2007-133299 A | 5/2007 |
| WO | WO 2004/090024 A1 | 10/2004 |

OTHER PUBLICATIONS

"Japan Society for the Promotion of Science Dai 142 linkai", Sep. 29, 1989, pp. 116 to 131, 199 to 202, 715 to 722, Ekisho Device Handbook, first edition 1st print.

Matsumoto et al. "Ekisho no Kiso to Oyo", Nov. 22, 1992, pp. 121-139, first edition, 2nd print, Kogyo Chosakai Publishing Co., Ltd.

Extended European Search Report dated Jun. 21, 2010 in corresponding European Patent Application No. 07744676.3.

* cited by examiner

*Primary Examiner* — Geraldina Vlsconti
(74) *Attorney, Agent, or Firm* — Birch, Stewart, Kolasch & Birch, LLP

(57) ABSTRACT

Provided are a cholesteric liquid crystal composition which contains a compound having a high Δn value and shows an orientation in a thick layer, and a circular polarization separator sheet having a wide reflection bandwidth and capable of being produced simply and easily. A cholesteric liquid crystal composition containing a compound represented by a formula (1): $R^1-A^1-B-A^2-R^2$ ($R^1$ and $R^2$ represent alkyl, alkylene oxide, H, halogen, hydroxyl, carboxyl, (meth)acryl, epoxy, mercapto, isocyanate, amino or cyano; $A^1$ and $A^2$ represent 1,4-phenylene, 1,4-cyclohexylene, 1,4-cyclohexenyl, 4,4'-biphenylene, 4,4'-bicyclohexylene or 2,6-naphthylene; and B represents a single bond, —COO— or the like) and a rod-shaped liquid crystal compound having Δn of 0.18 or more and at least two or more reactive groups per one molecule.

11 Claims, No Drawings

CHOLESTERIC LIQUID CRYSTAL COMPOSITION, CIRCULAR POLARIZATION SEPARATOR SHEET AND USE THEREOF

TECHNICAL FIELD

The present invention relates to a cholesteric liquid crystal composition useful for producing optical materials such as circular polarization separator sheets, a circular polarization separator sheet which is produced using the liquid crystal composition, as well as a brightness enhancement film and a liquid crystal display device comprising the circular polarization separator sheet.

BACKGROUND ART

It has been known that a circular polarization separator sheet which transmits a particular circularly polarized light and reflects other sort of light is provided in display devices such as liquid crystal display devices aiming at enhancement of the luminance of the device. As such a circular polarization separator sheet, there are known a sheet obtained by applying on a substrate a polymer having a cholesteric liquid crystallinity, and orienting and drying the polymer, and a sheet obtained by applying on a substrate a liquid crystal composition comprising a polymerizable monomer having a cholesteric liquid crystallinity, and orienting and polymerizing the monomer. As such a liquid crystal composition, many compositions are known in the prior art (e.g., US Patent Application Publication No. 2005/0045854, Japanese Patent No. 3677632 and JP Hei-8-3111-A).

It is preferable that the liquid crystal composition for preparing the circular polarization separator sheet contains a compound having a $\Delta n$ value (intrinsic birefringence value) as high as 0.18 or more in order to obtain a high optical property. However, there is a problem that the layer of such a high $\Delta n$ compound can only be thickened up to at most about 5 μm because otherwise a uniform orientation can not be obtained. In order to obtain a wider reflection bandwidth as the circular polarization separator sheet, those having a thicker thickness are required. Thus, in order to produce a circular polarization separator sheet having a wider reflection bandwidth, it is required to pile up a plurality of layers each having a thickness of about 3 μm with a uniform orientation, which brings about a problem of complicated steps.

DISCLOSURE OF INVENTION

Problem to be Solved by the Invention

An object of the present invention is to provide a cholesteric liquid composition which contains a high $\Delta n$ compound and which is capable of forming orientation in a thick layer having a thickness of 5 μm or higher.

Another object of the present invention is to provide a circular polarization separator sheet which has a wide reflection bandwidth and which can be easily produced, as well as the use of the circular polarization separator sheet.

Means for Solving Problem

The present inventors have made extensive studies in order to solve the aforementioned problems. As a result, the present inventors found out that addition to a liquid crystal composition of a compound having a specific structure together with a rod-shaped liquid crystal compound having reactive groups can result in good orientation of the rod-shaped liquid crystal compound having a high $\Delta n$ value, to thus complete the present invention. That is, the present invention provides the following:

(1) A cholesteric liquid crystal composition containing at least one compound represented by the following general formula (1):

$$R^1\text{-}A^1\text{-}B\text{-}A^2\text{-}R^2 \qquad (1),$$

wherein $R^1$ and $R^2$ each independently represent a group selected from the group consisting of a straight or branched alkyl group having 1 to 20 carbon atoms, which may be unsubstituted or substituted with one or more halogen atoms; a straight or branched alkylene oxide group having 1 to 20 carbon atoms, which may be unsubstituted or substituted with one or more halogen atoms; a hydrogen atom; a halogen atom, a hydroxyl group, a carboxyl group, a (meth)acryl group, an epoxy group, a mercapto group, an isocyanate group, an amino group and a cyano group, which may be bound to an alkyl or alkylene oxide group having 1 to 2 carbon atoms; $A^1$ and $A^2$ each independently represent a group selected from the group consisting of 1,4-phenylene group, 1,4-cyclohexylene group, 1,4-cyclohexenyl group, 4,4'-biphenylene group, 4,4'-bicyclohexylene group and 2,6-naphthylene group, which may be unsubstituted or substituted with one or more halogen atoms, hydroxyl groups, carboxyl groups, cyano groups, amino groups, and alkyl or halogenated alkyl groups having 1 to 10 carbon atoms; and B is selected from the group consisting of a single bond, —O—, —S—, —S—S—, —CO—, —CS—, —OCO—, —CH$_2$—, —OCH$_2$—, —CH=N—N=CH—, —NHCO—, —OCOO—, —CH$_2$COO— and —CH$_2$OCO—; and
at least one rod-shaped liquid crystal compound having $\Delta n$ of 0.18 or more and at least two reactive groups per one molecule,
wherein a ratio of a total weight of said compound of the general formula (1) to a total weight of said rod-shaped liquid crystal compound [(total weight of said compound of the general formula (1))/(total weight of said rod-shaped liquid crystal compound)] is 0.05 to 1.

(2) The cholesteric liquid crystal composition according to (1) wherein at least one of said compounds of the general formula (1) has a liquid crystallinity.

(3) The cholesteric liquid crystal composition according to (1) wherein at least one of said compounds of the general formula (1) has a chirality.

(4) The cholesteric liquid crystal composition according to (1) wherein at least one of said compounds of the general formula (1) has an optical property and said composition contains a mixture of a plurality of optical isomers thereof.

(5) The cholesteric liquid crystal composition according to (1) wherein at least one of said compounds of the general formula (1) has a melting point of 50 to 150° C.

(6) The cholesteric liquid crystal composition according to (1) wherein at least one of said rod-shaped liquid crystal compounds has an asymmetric structure.

(7) A circular polarization separator sheet obtained by applying the cholesteric liquid crystal composition according to (1) on a transparent resin substrate and curing said composition.

(8) A method for producing a circular polarization separator sheet comprising a step of applying the cholesteric liquid crystal composition according to (1) on a transparent resin substrate to obtain a liquid crystal layer and a step of curing said liquid crystal layer by at least one step of light irradiation and/or heating treatment.

(9) A brightness enhancement film comprising the circular polarization separator sheet according to (7) and a phase shift film.

(10) A liquid crystal display device comprising the brightness enhancement film according to (9) and a liquid crystal panel.

Effect of the Invention

The cholesteric liquid crystal composition of the present invention contains as a rod-shaped liquid crystal compound a compound having Δn of 0.18 or more, and nevertheless is capable of being oriented in a thick layer having a thickness of 5 μm or more. Thus the present composition is useful as a material for producing a circular polarization separator sheet having uniformity and wide reflection bandwidth.

The circular polarization separator sheet of the present invention has uniformity and wide reflection bandwidth. Therefore, the liquid crystal display of the present invention which has the brightness enhancement film of the present invention having the circular polarization separator sheet is capable of exhibit high brightness and uniform display properties.

BEST MODE FOR CARRYING OUT THE INVENTION

The cholesteric liquid crystal composition of the present invention contains a compound represented by the aforementioned general formula (1) and a specific rod-shaped liquid crystal composition. These components will be described sequentially.

In the general formula (1), $R^1$ and $R^2$ each independently represent a group selected from the group consisting of a straight or branched alkyl group having 1 to 20 carbon atoms, a straight or branched alkylene oxide group having 1 to 20 carbon atoms, a hydrogen atom, a halogen atom, a hydroxyl group, a carboxyl group, a (meth)acryl group, an epoxy group, a mercapto group, an isocyanate group, an amino group and a cyano group. "(Meth)acryl" herein means acryl and methacryl.

The alkyl group and the alkylene oxide group may be unsubstituted or substituted with one or more halogen atoms. The halogen atom, the hydroxyl group, the carboxyl group, the (meth)acryl group, the epoxy group, the mercapto group, the isocyanate group, the amino group and the cyano group may be bound to an alkyl or alkylene oxide group having 1 to 2 carbon atoms.

Preferable examples of those for $R^1$ and $R^2$ may include the halogen atom, the hydroxyl group, the carboxyl group, the (meth)acryl group, the epoxy group, the mercapto group, the isocyanate group, the amino group and the cyano group.

It is preferable that at least one of $R^1$ and $R^2$ is a reactive group. Having a reactive group as $R^1$ and/or $R^2$, the compound represented by the formula (1) may be fixed in the liquid crystal layer during the curing step, which leads to formation of an even stronger film. The reactive group referred to herein may be either one of a carboxyl group, a (meth)acryl group, an epoxy group, a mercapto group, an isocyanate group and an amino group.

In the general formula (1), $A^1$ and $A^2$ each independently represent a group selected from the group consisting of 1,4-phenylene group, 1,4-cyclohexylene group, 1,4-cyclohexenyl group, 4,4'-biphenylene group, 4,4'-bicyclohexylene group and 2,6-naphthylene group. The 1,4-phenylene group, 1,4-cyclohexylene group, 1,4-cyclohexenyl group, 4,4'-biphenylene group, 4,4'-bicyclohexylene group and 2,6-naphthylene group may be unsubstituted or substituted with one or more halogen atoms, hydroxyl groups, carboxyl groups, cyano groups, amino groups, and alkyl or halogenated alkyl groups having 1 to 10 carbon atoms. When two or more substituents are present in each of $A^1$ and $A^2$, they may be the same or different.

Particularly preferable examples of those for $A^1$ and $A^2$ may include the group selected from the group consisting of 1,4-phenylene group, 4,4'-biphenylene group and 2,6-naphthylene group. These aromatic structures are more rigid than the aliphatic structures. Thus these structures render a high affinity with the mesogen of the rod-shaped liquid crystal compound in the present liquid crystal composition, and thus render an even higher orientation uniformity.

In the general formula (1), B is selected from the group consisting of a single bond, —O—, —S—, —S—S—, —CO—, —CS—, —OCO—, —CH$_2$—, —OCH$_2$—, —CH=N—N=CH—, —NHCO—, —OCOO—, —CH$_2$COO— and —CH$_2$OCO—.

Particularly preferable examples of those for B may include the single bond, —OCO— and —CH=N—N=CH—.

It is preferable that one or more species of the compound of the formula (1) has a liquid crystal property. It is also preferable that the compound has a chirality. It is preferable that the liquid crystal composition of the present invention contains a mixture of a plurality of optical isomers. For example, the composition may contain a mixture of a plurality of species of enantiomer and/or diastereomer. It is preferable that one or more of the compound of the formula (1) has a melting point in a range of 50° C. to 150° C.

In the case that the compound of the formula (1) has a liquid crystal property, it is preferable that the compound has a high Δn. Containing a liquid crystal compound having a high Δn, Δn of the cholesteric liquid crystal compound can also be improved, which enables production of circular polarization separator sheet having a high bandwidth. The Δn of one or more of the compound of the formula (1) may preferably be 0.18 or more, and more preferably 0.22 or more.

Particularly preferable examples of the compound of the general formula (1) may include the following compounds (A1) to (A3) and (A5) to (A10).

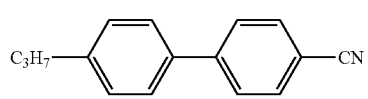

(A1)

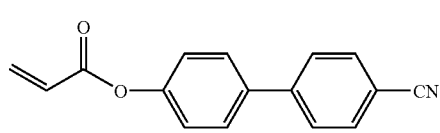

(A2)

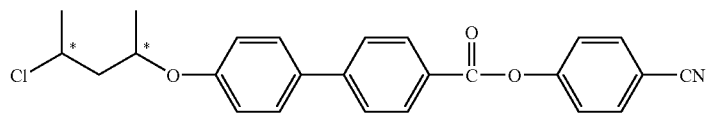

(A3)

-continued

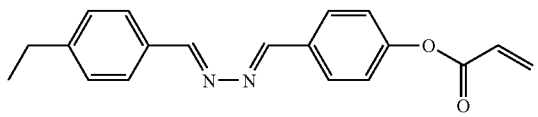 (A5)

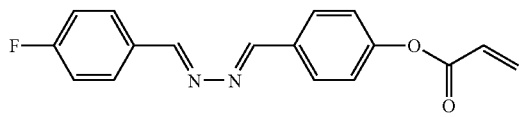 (A6)

(A7)

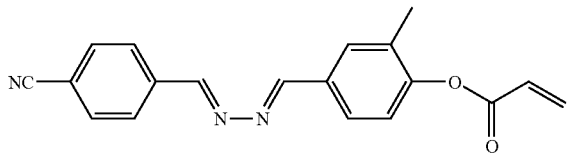

(A8)

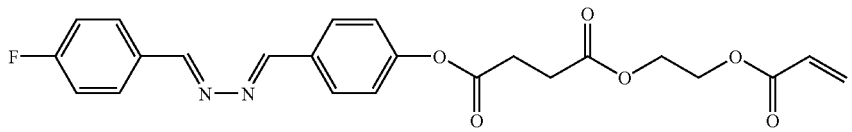

(A9)

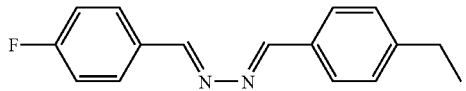

(A10)

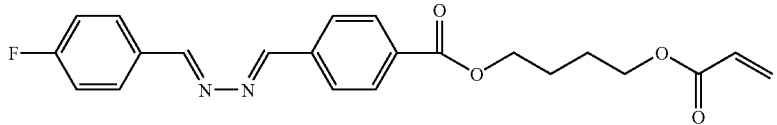

In the aforementioned compound (A3), "*" indicates a chiral center.

The cholesteric liquid crystal composition of the present invention contains a specific rod-shaped liquid crystal compound.

The rod-shaped liquid crystal compound for the present invention has a Δn value of 0.18 or more and has at least two reactive groups per one molecule.

An example of the rod-shaped liquid crystal compound may be a compound represented by the formula (2):

$$R^3-C^3-D^3-C^5-M-C^6-D^4C^4-R^4 \quad \text{(formula 2)},$$

wherein, $R^3$ and $R^4$ are the reactive groups, and each independently represent a group selected from the group consisting of a (meth)acryl group, a (thio)epoxy group, an oxetane group, a thietanyl group, an aziridinyl group, a pyrrol group, a vinyl group, an allyl group, a fumarate group, a cinnamoyl group, an oxazoline group, a mercapto group, an iso(thio)cyanate group, an amino group, a hydroxyl group, a carboxyl group and an alkoxysilyl group; $D^3$ and $D^4$ represent a group selected from the group consisting of a single bond, a straight or branched alkyl group having 1 to 20 carbon atoms and a straight or branched alkylene oxide group having 1 to 20 carbon atoms; $C^3$ to $C^6$ represent a group selected from the group consisting of a single bond, —O—, —S—, —S—S—, —CO—, —CS—, —OCO—, —CH$_2$—, —OCH$_2$—, —CH=N—N=CH—, —NHCO—, —OCOO—, —CH$_2$COO— and —CH$_2$OCO—; and M represents a mesogenic group, and is specifically formed of 2 to 4 skeletons selected from the group consisting of azomethines, azoxys, phenyls, biphenyls, terphenyls, naphthalenes, anthracenes, benzoate esters, cyclohexane carboxylate phenyl esters, cyanophenyl cyclohexanes, cyano-substituted phenylpyrimidines, alkoxy-substituted phenylpyrimidines, phenyldioxanes, tolans and alkenylcyclohexylbenzonitriles, which may be unsubstituted or may have a substituent(s), the skeletons being bound via binding groups such as —O—, —S—, —S—S—, —CO—, —CS—, —OCO—, —CH$_2$—, —OCH$_2$—, —CH=N—N=CH—, —NHCO—, —OCOO—, —CH$_2$COO— and —CH$_2$OCO—. Examples of the substituents which the mesogenic group M may have may include a halogen atom, an alkyl group having 1 to 10 carbon atoms which may have a substituent, a cyano group, a nitro group, —O—$R^5$, —O—C(=O)—$R^5$, —C(=O)—O—$R^5$, —O—C(=O)—O—$R^5$, —NR$^5$—C(=O)—$R^5$, —C(=O)—NR$^5$ or —O—C(=O)—NR$^5$. Here $R^5$ represents a hydrogen atom or an alkyl group having 1 to 10 carbon atoms. When $R^5$ represents the alkyl group, the alkyl group may have —O—, —S—, —O—C(=O)—, —C(=O)—O—, —O—C(=O)—O—, —NR$^6$—C(=O)—, —C(=O)—NR$^6$—, —NR$^6$— or —C(=O)— intervening therein (but two or more of each —O— and —S— may not be adjacently present). $R^6$ referred to herein represents a hydrogen atom or an alkyl group having 1 to 6 carbon atoms. Examples of the substituents in the "alkyl group having 1 to 10 carbon atoms which may have a substituent" may include a halogen atom, a hydroxyl group, a carboxyl group, a cyano group, an amino group, an alkoxy group having 1 to 6 carbon atoms, an alkoxyalkoxyl group having 2 to 8 carbon atoms, an alkoxyalkoxyalkoxy group having 3 to 15 carbon atoms, an alkoxycarbonyl group having 2 to 7 carbon atoms, an alkylcarbonyloxy group having 2 to 7 carbon atoms and an alkoxycarbonyloxy group having 2 to 7 carbon atoms.

In the present invention, it is preferable that the rod-shaped liquid crystal compound has an asymmetric structure. The asymmetric structure means a structure wherein $R^3$—$C^3$-$D^3$-$C^5$— and —$C^6$-$D^4$-$C^4$—$R^4$ are different around the center mesogen group M. By employing such an asymmetric compound as the rod-shaped liquid crystal compound, the orientation uniformity may further be improved.

The rod-shaped liquid crystal compound has Δn of 0.18 or more, preferably 0.22 or more. When employing a compound having Δn of 0.30 or more, the long wavelength end of the ultraviolet absorption spectrum possibly reaches visible wavelength region. Even if the end of the absorption spectrum reaches the visible wavelength region, the sheet having such a spectrum may be used as long as the desired optical properties are not adversely affected thereby. Having such a high Δn value can give a circular polarization separator sheet having high optical properties (such as an ability to separate circular polarized light).

In the present invention, the rod-shaped liquid crystal compound has at least two reactive groups per one molecule. Examples of the reactive groups may specifically include an epoxy group, a thioepoxy group, an oxetanyl group, a thietanyl group, an aziridinyl group, a pyrrol group, a fumarate group, a cinnamoyl group, an isocyanate group, an isothiocyanate group, an amino group, a hydroxyl group, a carboxyl group, an alkoxysilyl group, an oxazoline group, a mercapto group, a vinyl group, an allyl group, a methacryl group and an acryl group. Having such reactive groups, curing of the cholesteric liquid crystal composition of the present invention can give a stable cured product. When a compound having one or less reactive group per one molecule is used, curing of the cholesteric liquid crystal composition does not give a cross-linked cured product. Therefore such a composition cannot give a practically useful film strength. Even if the crosslinking agent which will be explained later is used, film strength would become insufficient for practical use. The film strength for practical use is, in terms of the pencil hardness (JIS K5400), HB or harder, preferably H or harder. The film having a film strength of less than HB may easily have scratch scars and thus have poor handling ability. Preferable upper limit of the pencil hardness is not particularly limited as long as the hardness does not adversely affect on optical properties and durability test results.

In the cholesteric liquid crystal composition of the present invention, a weight ratio of [total weight of the compound of the general formula (1)]/[total weight of the rod-shaped liquid crystal compound] is 0.05 to 1, preferably 0.1 to 0.65 and more preferably 0.15 to 0.45.

The weight ratio being less than 0.05 is unpreferable because the orientation uniformity may become insufficient thereby. The weight ratio being more than 1 is also unpreferable because orientation uniformity may become lowered, stability of the liquid crystal phase may become lowered, and Δn as a liquid crystal composition may become lowered, by which desired optical properties (such as an ability to separate circular polarized light) may not be obtained. The total weight herein means, if one species is used, the weight thereof, and, if more than one species is used, the total weight of these species.

In the cholesteric liquid crystal composition of the present invention, it is preferable that the molecular weight of the compound of the general formula (1) is less than 600 and the molecular weight of the rod-shaped liquid crystal compound is 600 or more. By making the molecular weight of the compound of the general formula (1) less than 600, the compound of the general formula (1) can reside in spaces among the molecules of the rod-shaped liquid crystal compound having larger molecular weight, whereby an orientation uniformity can be enhanced.

The cholesteric liquid crystal composition of the present invention may optionally contain a crosslinking agent, in order to improve film strength and durability after curing. The crosslinking agent for use may be appropriately selected from those which are capable of increasing crosslinking density of the liquid crystal layer by reaction which occurs simultaneously with the curing of the liquid crystal layer of the applied liquid crystal composition, by the reaction promoted by the heat treatment after curing, or by the moisture which promotes spontaneous reaction. Another criterion for selecting crosslinking agent may be absence of properties to worsen orientation uniformity. Preferable examples of the crosslinking agent may include those which cause curing by, e.g., ultraviolet ray, heat or moisture. Specific examples of the crosslinking agent may include multifunctional acrylate compounds such as trimethylolpropane tri(meth)acrylate, pentaerythritol tri(meth)acrylate, pentaerythritol tetra(meth)acrylate, dipentaerythritol hexa(meth)acrylate and 2-(2-vinyloxyethoxy)ethyl acrylate; epoxy compounds such as glycidyl (meth)acrylate, ethylene glycol diglycidyl ether, glycerine triglycidyl ether and pentaerythritol tetraglycidyl ether; aziridine compounds such as 2,2-bishydroxymethylbutanol-tris[3-(1-aziridinyl) propionate], 4,4-bis(ethyleneiminocarbonylamino) diphenylmethane and trimethylolpropane-tri-β-aziridinyl propionate; isocyanate compounds such as hexamethylene diisocyanate, as well as isocyanurate type isocyanate, biuret type isocyanate and adduct type isocyanate derived from hexamethylene diisocyanate; polyoxazoline compounds having an oxazoline group in a side chain; and alkoxysilane compounds such as vinyl trimethoxysilane, N-(2-aminoethyl)3-aminopropyl trimethoxysilane, 3-aminopropyl trimethoxysilane, 3-glycidoxypropyl trimethoxysilane, 3-(meth)acryloxypropyl trimethoxysilane and N-(1,3-dimethylbutylidene)-3-(triethoxysilyl)-1-propaneamine.

Depending on the reactivity of the crosslinking agent, a publicly known catalyst may be used for enhancing the productivity in addition to the enhancement of film strength and durability.

It is preferable that the ratio of the crosslinking agent to be added is 0.1 to 15% by weight in a cured film obtained by curing the cholesteric liquid crystal composition. If the ratio of the crosslinking agent is less than 0.1% by weight, the effect of increasing crosslinking density may not be obtained and thus unpreferable. If the ratio is more than 15% by weight, the crosslinking agent may decrease stability of the liquid crystal layer and thus unpreferable.

The cholesteric liquid crystal composition of the present invention may optionally contain a photoinitiator. Publicly known compounds which generate a radical or an acid by ultraviolet light or visible light may be used as a photoinitiator. Specific examples thereof may include benzoin, benzylmethyl ketal, benzophenone, biacetyl, acetophenone, Michler's ketone, benzyl, benzylisobutyl ether, tetramethylthiuram mono(di)sulfide, 2,2-azobisisobutylonitrle, 2,2-azobis-2,4-dimethylvaleronitrile, benzoyl peroxide, di-tert-butyl peroxide, 1-hydroxycyclohexyl phenyl ketone, 2-hydroxy-2-methyl-1-phenyl-propane-1-one, 1-(4-isopropylphenyl)-2-hydroxy-2-methylpropane-1-one, thioxanthone, 2-chlorothioxanthone, 2-methylthioxanthone, 2,4-diethylthioxanthone, methylbenzoyl formate, 2,2-diethoxyacetophenone, β-ionone, β-bromostyrene, diazoaminobenzene, α-amyl cinnamic aldehyde, p-dimethylamino acetophenone, p-dimethylamino propiophenone, 2-chlorobenzophenone, p,p'-dicholobenzophenone, p,p'-bis-diethylaminobenzophenone, benzoin ethyl ether, benzoin isopropyl ether, benzoin n-propyl ether, benzoin n-butyl ether, diphenyl sulfide, bis(2,6-methoxybenzoyl)-2,4,4-trimethyl-pentylphosphine oxide, 2,4,6-trimethylbenzoyldiphenyl-phosphine oxide, bis(2,4,6-trimethylbenzoyl)-phenyl phosphine oxide, 2-methyl-1[4-(methylthio)phenyl]-2-morpholinopropane-1-one, 2-benzyl-2-dimethylamino-1-(4-morpholinophenyl)-butane-1-one, anthracene benzophenone, α-chloroanthraquinone, diphenyl disulfide, hexachlorobutadiene, pentachlorobutadiene, octachlorobutene, 1-chloromethylnaphthaline, 1,2-octadione, 1-[4-(phenylthio)-2-(o-benzoyloxime)], 1-[9-ethyl-6-(2-methylbenzoyl)-9H-carbazole-3-yl]ethanone 1-(o-acetyloxime), (4-methylphenyl)[4-(2-methylpropyl)phenyl]iodonium hexafluorophosphate, 3-methyl-2-butynyltetramethylsulfonium hexafluoroantimonate and diphenyl-(p-phenylthiophenyl)sulfonium hexafluoroantimonate. Two or more compounds may be mixed depending on a desired physical property. If necessary, a tertiary amine compound as a publicly known photosensitizer or polymerization accelerator may be added for controlling a curable property. It is preferable that the containing ratio of the photoinitiator in the cholesteric liquid crystal composition is 0.03 to 7% by weight. If the ratio of the photoinitiator is less than 0.03% by weight, polymerization ratio may become lowered and the film strength may thus become lowered, and thus unpreferable. If the ratio is more than 7% by weight, the photoinitiator may disturb orientation of the liquid crystal and make the liquid crystal phase unstable, and thus unpreferable.

The cholesteric liquid crystal composition of the present invention may optionally contain a surfactant. Those which do not inhibit the orientation may be appropriately selected and used as the surfactant. As the surfactant, specifically a nonionic surfactant containing siloxane and an alkyl fluoride group in a hydrophobic group portion may suitably be used. An oligomer having two or more hydrophobic group portions per one molecule is particularly suitable. As the surfactant, it is possible to use PF-151N, PF-636, PF-6320, PF-656, PF-6520, PF-3320, PF-651 and PF-652 of PolyFox supplied from OMNOVA, FTX-209F, FTX-208G and FTX-204D of Ftergent supplied from Neos Co., Ltd., and KH-40 of Surflon supplied from Seimi Chemical Co., Ltd. It is preferable that the amount of the surfactant to be added is 0.05 to 3% by weight in the cured film obtained by curing the cholesteric liquid crystal composition. The amount being less than 0.05% by weight is not preferable because a force for regulating the orientation is reduced on an air interface to cause an orientation defect in some cases. The amount being more than 3% by weight is not preferable either because the amount of the surfactant residing among liquid crystal molecules may become excessive to reduce the orientation uniformity.

If necessary, the cholesteric liquid crystal composition of the present invention may contain other optional ingredients. Examples of the optional ingredients may include chiral agents, solvents, polymerization inhibitors for enhancing a pot life, and antioxidants, ultraviolet light absorbers and photo stabilizers for enhancing a durability. These optional ingredients may be added in an amount range which does not reduce desired optical performances.

The method for producing the cholesteric liquid crystal composition of the present invention is not particularly limited, and it may be produced by mixing the aforementioned essential ingredients and optional ingredients.

The circular polarization separator sheet of the present invention is obtained by applying the cholesteric liquid crystal composition of the present invention on a transparent resin substrate to obtain a liquid crystal layer, and then curing the layer by at least one step of light irradiation and/or heating treatment.

The transparent resin substrate is not particularly limited, and may preferably be a substrate having a total light transmittance of 80% or more when configured in a form of plate having a thickness of 1 mm. Specific examples thereof may include monolayer or multilayer films composed of synthetic resins, e.g., alicyclic olefin polymers, chain olefin polymers such as polyethylene and polypropylene, triacetylcellulose, polyvinyl alcohol, polyimide, polyarylate, polyester, polycarbonate, polysulfone, polyether sulfone, modified acryl polymers, epoxy resins, polystyrene and acryl resins. Among them, the alicyclic olefin polymers and the chain olefin polymers are preferable, and the alicyclic olefin polymers are particularly preferable in terms of transparency, low moisture absorbability, size stability and light weight.

If necessary, the transparent resin substrate may have an orientation film. By having the orientation film, the cholesteric liquid crystal composition applied thereon may be oriented in a desired direction. The orientation film may be formed by, after giving an optional corona discharge treatment to the substrate surface, applying a solution obtained by dissolving cellulose, a silane coupling agent, polyimide, polyamide, polyvinyl alcohol, epoxy diacrylate, a silanol oligomer, polyacrylonitrile, a phenol resin, polyoxazole, cyclized polyisoprene or the like in water or the solvent on the substrate surface using the publicly known method such as reverse gravure coating, direct gravure coating, die coating or bar coating, followed by drying and then giving a rubbing treatment to the dry film. The orientation film may have a film thickness which is capable of giving a desired orientation uniformity of the liquid crystal layer. The thickness thereof may preferably be 0.001 to 5 μm and more preferably 0.01 to 2 μm.

The liquid crystal composition may be applied onto the transparent resin substrate by any publicly known method such as reverse gravure coating, direct gravure coating, die coating or bar coating. The thickness of the applied layer of the liquid crystal composition may be appropriately controlled so as to obtain the dry film thickness of the desired liquid crystal layer described later.

Before curing the applied layer obtained by the aforementioned application procedure, an orientation treatment may be given if necessary. The orientation treatment may be performed, for example, by heating the applied layer at 50 to 150° C. for 0.5 to 10 minutes. Such an orientation treatment may give good orientation of the cholesteric liquid crystal layer.

After the optional orientation process, the cholesteric liquid crystal composition may be cured to obtain a circular polarization separator sheet having a cured layer of the cholesteric liquid crystal composition (which may be simply referred to as a "cured liquid crystal layer"). The curing treatment may be performed by one or more steps of the combination of the light irradiation and heating treatment. Specifically, the heating may be performed at a temperature of 40 to 200° C., preferably 50 to 200° C., more preferably 50 to 140° C., and for a time period of 1 second to 3 minutes, preferably 5 to 120 seconds. The light used for the light irradiation in the present invention includes not only visible light but also the ultraviolet light and other electromagnetic waves. The light irradiation may be performed specifically, for example by irradiating the light at a wavelength of 200 to 500 nm for 0.01 seconds to 3 minutes. For example, irradiation with weak ultraviolet light at 0.01 to 50 mJ/cm$^2$ and heating may be performed in an alternate manner to obtain a circular polarization separator sheet having a wide reflection bandwidth.

After the extension of the reflection bandwidth with the weak ultraviolet light, irradiation with relatively strong ultraviolet light at 50 to 10,000 mJ/cm$^2$ may be performed to completely polymerize the liquid crystal compound, to thereby obtain a cured liquid crystal layer. The extension of the reflection bandwidth and the irradiation of the strong ultraviolet light may be performed in air, or alternatively a part or all of the process may be performed in an atmosphere in which an oxygen concentration is controlled (e.g., under a nitrogen atmosphere).

In the present invention, the number of performing a series of the steps of applying the cholesteric liquid crystal composition onto the transparent resin substrate and curing the layer is not limited to once. The series of applying and curing may be repeated more than one times to form two or more cured liquid crystal layers. However, in the present invention, a cured liquid crystal layer having a thickness of 5 μm or more and containing a well-oriented rod-shaped liquid crystal compound having Δn of 0.18 or more may be easily produced by only one series of applying and curing the cholesteric liquid crystal composition.

In the circular polarization separator sheet of the present invention, the dry film thickness of the cured liquid crystal layer may be preferably 3.0 to 10.0 μm and more preferably 3.5 to 8 μm. When the dry film thickness of the cured liquid crystal layer is thinner than 3.0 μm, the reflectance may be reduced, whereas when the layer is thicker than 10.0 μm, the cured liquid crystal layer may be colored when observed in an oblique direction. Thus the both cases are not preferable. The dry film thickness means the total film thickness of all of the layers when the sheet has two or more cured liquid crystal layers, and means the film thickness itself when the cured liquid crystal layer is a monolayer.

The brightness enhancement film of the present invention comprises the circular polarization separator sheet of the present invention and a phase shift film. Specifically, the circular polarization separator sheet and the phase shift film may be laminated to make the brightness enhancement film of the present invention. The lamination may be accomplished by integrating the circular polarization separator sheet and the phase shift film via an adhesive agent or a tacky agent. Furthermore, for the purpose of enhancing the durability and a rigidity of the brightness enhancement film, it is also possible to integrate therewith an additional transparent resin substrate on the transparent resin substrate and/or the phase shift film via the adhesive agent or the tacky agent.

The phase shift film for use in the present invention may be (i) a stretched film obtained by stretching a film polymer or (ii) a film obtained by applying a liquid crystal material on a transparent resin substrate, orienting the material and then curing the material. As the phase shift film of (ii), the brightness enhancement film may be produced by applying the liquid crystal material on the appropriate substrate, orienting the material and then curing the material to obtain the phase shift film, and then integrating the phase shift film with the circular polarization separator sheet. Alternatively, the brightness enhancement film may also be produced by the process in which the circular polarization separator sheet is, after optionally providing thereon a orientation film and giving thereon a variety of orientation treatment, coated with a liquid crystal material, and then the coated layer is oriented and then cured, to obtain a layer of the phase shift film integrated with the circular polarization separator sheet.

A preferable example of the phase shift film used for the present invention may be an optically anisotropic element described below.

The optically anisotropic element of the present invention may have a retardation in a front direction (hereinafter sometimes abbreviated as "Re") of about ¼ wavelength of the light which is to transmit therethrough. The wavelength range of the transmitting light may be of the desired range required for the brightness enhancement film of the present invention, and is specifically for example 400 to 700 nm. The retardation in the front direction Re being about ¼ wavelength of the transmitting light means that the Re value is within ±65 nm, preferably ±30 nm and more preferably ±10 nm from a ¼ value of a center value of the wavelength range of the transmitting light.

The optically anisotropic element desirably has a retardation in the thickness direction Rth (hereinafter sometimes abbreviated "Rth") of less than 0 nm. The value of the retardation in the thickness direction Rth may be preferably −30 to −1000 nm and more preferably −50 to −300 nm when measured at the center value in the wavelength range of the transmitting light. Employment of the optically anisotropic element having such Re and Rth values enables to reduce an color unevenness of emitted light while the luminance is enhanced and the luminance unevenness is reduced.

The retardation in the front direction Re is the value represented by the formula (I): $Re=(nx-ny) \times d$, wherein nx represents a refraction index in the direction perpendicular to the thickness direction (front direction) and giving the maximum refraction index, ny represents a refraction index in the direction perpendicular to the thickness direction (in-plane direction) and orthogonal to nx, and d represents the film thickness. The retardation in the thickness direction Rth is represented by the formula II: $Rth=\{(nx+ny)/2-nz\} \times d$, wherein nx represents a refraction index in the direction perpendicular to the thickness direction (in-plane direction) and giving the maximum refraction index, ny represents a refraction index in the direction perpendicular to the thickness direction (in-plane direction) and orthogonal to nx, nz represents a refraction index in the thickness direction, and d represents the film thickness.

The retardation in the front direction Re and the retardation in the thickness direction Rth are determined by measuring the optically anisotropic element in lattice points throughout the element with 100 mm intervals along the longitudinal direction and width direction (when the length in the longitudinal direction or a crosswise direction is less than 200 mm, three points with equal intervals are designated in that direction) using a commercially available phase shift measurement apparatus, and calculating their average values.

Materials which compose the optically anisotropic element are not particularly limited, and those having a layer composed of a styrene resin may be preferably used. The styrene resin is a polymer resin having a styrene structure as a part or all of repeating units, examples of which may include polystyrene, or copolymers of styrene monomers such as styrene, α-methylstyrene, o-methylstyrene, p-methylstyrene, p-chlorostyrene, p-nitrostyrene, p-aminostyrene, p-carboxystyrene and p-phenylstyrene with the other monomers such as ethylene, propylene, butadiene, isoprene, acrylonitrile, methacrylonitrile, α-chloroacrylonitrile, methyl acrylate, methyl methacrylate, ethyl acrylate, ethyl methacrylate, acrylic acid, methacrylic acid, maleic acid anhydrate and vinyl acetate. Among them, polystyrene or the copolymer of styrene with maleic acid anhydrate may be used suitably.

The molecular weight of the styrene resin used for the optically anisotropic resin is appropriately selected depending on the intended use, and is typically 10,000 to 300,000, preferably 15,000 to 250,000 and more preferably 20,000 to 200,000 as a weight average molecular weight (Mw) in terms of polyisoprene measured by gel permeation chromatography using cyclohexane as the solvent.

The optically anisotropic element preferably has a laminated structure of the layer composed of the styrene resin and the layer containing another thermoplastic resin. The element having such a laminated structure may have both an optical property attributed to the styrene resin simultaneously and a mechanical strength attributed to another thermoplastic resin.

Examples of the aforementioned other thermoplastic resins may include alicyclic olefin polymers, methacryl resins, polycarbonate, copolymer resins of acrylate ester/vinyl aromatic compound, copolymer resins of methacrylate ester/vinyl aromatic compound, and polyether sulfone. Among them, the resin having the alicyclic structure and the methacryl resin may be used suitably.

The alicyclic olefin polymer is an amorphous olefin polymer having a cycloalkane or cycloalkene structure in a main chain and/or a side chain. Specific examples thereof may include (1) norbornene polymers, (2) monocyclic olefin polymers, (3) cyclic conjugated diene polymers, (4) vinyl alicyclic hydrocarbon polymers, and hydrogenated products thereof. Among them, the norbornene polymer is preferable in terms of transparency and molding property. Examples of these resins having the alicyclic structure may include those described in JP Hei-05-310845-A, JP Hei-05-097978-A and U.S. Pat. No. 6,511,756.

Examples of the norbornene polymers may specifically include ring opening polymers of norbornene monomers, ring opening copolymers of the norbornene monomer with another ring opening-polymerizable monomer, and hydrogenated products thereof, addition polymers of norbornene monomers and addition copolymers of the norbornene monomer with another addition-polymerizable monomer.

The methacryl resin is a polymer composed mainly of methacrylate ester, and examples thereof may include homopolymers of methacrylate ester and copolymers of methacrylate ester with another monomer. Usually, alkyl methacrylate is used as methacrylate ester. When the copolymer is produced, acrylate ester, an aromatic vinyl compound and a vinyl cyan compound are used as another monomer to be copolymerized with methacrylate ester.

A preferable specific embodiment of the optically anisotropic element for the present invention may be a stretched multilayer film obtained by stretching a multilayer film which has been prepared by, on the both sides of a film (layer a) composed of the polystyrene resin, laminating a film (layer b) composed of another thermoplastic resin. The specific embodiment thereof will be described below.

As the polystyrene resin which composes the layer a, it is possible to use the same ones as in the aforementioned "styrene resins".

The glass transition temperature of the polystyrene resin which composes the layer a is preferably 120° C. or higher, more preferably 120 to 200° C. and still more preferably 120 to 140° C.

In the present invention, it is preferable that the polystyrene resin and the other thermoplastic resin satisfy a relationship of Tg(a)>Tg(b)+20° C. wherein their glass transition temperatures are Tg(a) (° C.) and Tg(b) (° C.), respectively. By satisfying such a relationship, it is possible to effectively give the optical anisotropy to the layer a composed of the polystyrene resin upon being stretched, to thereby yield a good optically anisotropic element.

There is no particular limitation on the method for laminating the polystyrene resin which is the material of the layer a and another thermoplastic resin which is the material of the layer b to configure the multilayer film. Publicly known methods, e.g., molding methods by coextrusion such as a coextrusion T die method, a coextrusion inflation method and a coextrusion lamination method, film lamination molding methods such as a dry lamination, and coating molding methods may be appropriately utilized. Among them, the molding method by the coextrusion is preferable in terms of production efficiency and avoiding residual volatile component such as a solvent in the film. The extrusion temperature may be appropriately selected depending on the types of the polystyrene resin and another thermoplastic resin to be used.

The multilayer film is obtainable by laminating the layer b on the both sides of the layer a. Between the layer a and the layer b, an adhesive layer or a tacky layer may be provided. However, it is preferable to directly laminate the layer a and the layer b (i.e., to produce a laminate having three layered structure of (layer b)/(layer a)/(layer b)). In the multilayer film, the thickness of the layer b laminated on the both sides of the layer a is not particularly limited, and may be preferably 10 to 300 μm and 10 to 400 μm, respectively.

The stretched multilayer film is obtainable by stretching the multilayer film. The stretched multilayer film may contain a layer A provided by stretching the layer a and a layer B provided by stretching the layer b. The stretched multilayer film is preferably obtainable by stretching the laminate of the three layered structure of (layer b)/(layer a)/(layer b) of the multilayer film, and is preferably the stretched film of the three layered structure of (layer B)/(layer A)/(layer B).

The stretching may be performed preferably by a monoaxial stretching or an oblique stretching, and more preferably by the monoaxial stretching or the oblique stretching by a tenter.

The retardation in the front direction Re and the retardation in the thickness direction Rth of the optically anisotropic element may be generated by appropriately controlling stretching conditions such as a stretching temperature and a stretching ratio. The stretching temperature is preferably Tg(a)−10° C. to Tg(a)+20° C., and more preferably Tg(a)−5° C. to Tg(a)+15° C. The stretching ratio is preferably 1.05 to 30 times and more preferably 1.1 to 10 times. When the stretching temperature and the stretching ratio are out of the aforementioned ranges, the orientation may become insufficient, which may lead to insufficient refraction index anisotropy, and thus insufficient retardation expression. The conditions out of the aforementioned ranges may also cause fracture of the laminated body.

The thickness of the optically anisotropic element is preferably 50 to 1,000 μm and more preferably 50 to 600 μm.

The liquid crystal display device of the present invention comprises the brightness enhancement film of the present invention and a liquid crystal panel.

The liquid crystal panel is not particularly limited, and those used for the liquid crystal display device may be appropriately used. Examples thereof may include TN (Twisted Nematic) type liquid crystal panels, STN (Super Twisted Nematic) type liquid crystal panels, HAN (Hybrid Alignment Nematic) type liquid crystal panels, IPS (In Plane Switching) type liquid crystal panels, VA (Vertical Alignment) type liquid crystal panels, MVA (Multiple Vertical Alignment) type liquid crystal panels and OCB (Optical Compensated Bend) type liquid crystal panels.

The liquid crystal display device may further contain a backlight, and may be constituted so that the brightness enhancement film is arranged between the backlight and the liquid crystal panel. More specifically, in the region between the backlight and the liquid crystal cell in the liquid crystal display device, the brightness enhancement film of the present invention may be arranged so that the layer of the circular polarization separator sheet is closer to the backlight than the layer of the phase shift film, to thereby accomplish enhancement of the luminance.

EXAMPLES

The present invention will be explained hereinbelow in more detail with reference to the Examples. However, the present invention is not limited thereto.

Example 1

(1-1: Preparation of Transparent Resin Substrate Having Orientation Film)

A corona discharge treatment was given to both sides of a film (brand name: Zeonor Film ZF14-100 supplied from Optes Inc.) composed of an alicyclic olefin polymer. An aqueous solution of 5% polyvinyl alcohol was applied onto one side of the film using a #2 wire bar, and the coating layer was dried to form an orientation film having a film thickness of 0.1 μm. Then, a rubbing treatment was given to the orientation film to prepare a transparent resin substrate having the orientation film.

(2-1: Formation of Cured Liquid Crystal Layer)

Ingredients were mixed at a mixing ratio shown in Table 1 to prepare a cholesteric liquid crystal composition having a solid content of 40%. This cholesteric liquid crystal composition was applied using a #10 wire bar onto the side having the orientation film of the transparent resin substrate having the orientation film prepared in the aforementioned (1-1). An orientation treatment at 100° C. for 5 minutes was given to the coating layer, and subsequently ultraviolet light at 500 mJ/cm$^2$ was irradiated to the coating layer, to produce a circular polarization separator sheet having a cured liquid crystal layer having a dry layer thickness of 5 μm.

(1-3: Evaluation)

For the circular polarization separator sheet obtained in 1-2, a haze value was measured in accordance with JIS K7136 to evaluate an orientation uniformity. The cases having the haze value of less than 2.0%, 2.0% or more and less than 3.0%, and 3.0% or more were determined as "good", "intermediate" and "poor", respectively. Evaluation results are shown in Table 1.

Examples 2 to 5 and Comparative Examples 1 to 5

Circular polarization separator sheets were made and the orientation uniformity thereof was evaluated in the same manner as in Example 1 except that the cholesteric liquid crystal composition was composed as shown in Tables 1 and 2. The evaluation results are shown in Tables 1 and 2. From the results shown in Tables 1 and 2, the following is found. The cholesteric liquid crystal composition in Examples can yield circular polarization separator sheets having good orientation uniformity. On the contrary, those containing no compound represented by the general formula (1) in the cholesteric liquid crystal composition (Comparative Examples 2 and 3), and those wherein a ratio of [total weight of the compound represented by the general formula (1)]/[total weight of the rod-shaped liquid crystal compound] is less than 0.5 or more than 1 (Comparative Examples 1, 4, 5) gave the obtained circular polarization separator sheets which were inferior in orientation uniformity.

TABLE 1

| Materials | Ex. 1 | Ex. 2 | Ex. 3 | Ex. 4 | Ex. 5 |
|---|---|---|---|---|---|
| Rod-shaped liquid crystal compound having Δn of 0.18 (parts by weight) | 33.0 | — | — | — | — |
| Rod-shaped liquid crystal compound having Δn of 0.23 (parts by weight) | — | 19.7 | — | 27.2 | 32.0 |
| Rod-shaped liquid crystal compound having Δn of 0.32 (parts by weight) | — | — | 27.4 | — | — |
| A1 compound (melting point 66° C.; parts by weight) | 3.5 | — | — | — | — |
| A2 compound (melting point 103° C.; parts by weight) | — | 16.2 | 9.2 | — | — |
| A3 compound ((S,S) isomer, melting point 104° C.; parts by weight) | — | — | — | 11.6 | — |
| A3 compound containing isomers (parts by weight) | — | — | — | — | 4.8 |
| Chiral agent LC756 (BASF; parts by weight) | 2.3 | 2.9 | 2.2 | — | 2.0 |
| Polymerization initiator Irgacure 907 (Ciba Specialty Chemicals; parts by weight) | 1.2 | 1.2 | 1.2 | 1.2 | 1.2 |
| Surfactant; fluorine surfactant KH40 (Seimi Chemicals; parts by weight) | 0.04 | 0.04 | 0.04 | 0.04 | 0.04 |
| 2-Butanone (parts by weight) | 60 | 60 | 60 | 60 | 60 |
| Ratio of (A1-A3 compounds)/(Rod-shaped liquid crystal compound) | 0.11 | 0.82 | 0.34 | 0.43 | 0.15 |
| Orientation uniformity | Good | Good | Good | Good | Good |

TABLE 2

| Materials | Comp. Ex. 1 | Comp. Ex. 2 | Comp. Ex. 3 | Comp. Ex. 4 | Comp. Ex. 5 |
|---|---|---|---|---|---|
| Rod-shaped liquid crystal compound having Δn of 0.18 (parts by weight) | 35.0 | — | — | 10.6 | 6.6 |
| Rod-shaped liquid crystal compound having Δn of 0.23 (parts by weight) | — | 35.9 | — | — | — |
| Rod-shaped liquid crystal compound having Δn of 0.32 (parts by weight) | — | — | 36.8 | — | — |
| A1 compound (melting point 66° C.; parts by weight) | 1.5 | — | — | 26.0 | — |
| A2 compound (melting point 103° C.; parts by weight) | — | — | — | — | 30.0 |
| A3 compound ((S,S) isomer, melting point 104° C.; parts by weight) | — | — | — | — | — |
| A3 compound containing isomers (parts by weight) | — | — | — | — | — |
| Chiral agent LC756 (BASF; parts by weight) | 2.3 | 2.9 | 2.0 | 2.2 | 2.2 |
| Polymerization initiator Irgacure 907 (Ciba Specialty Chemicals; parts by weight) | 1.2 | 1.2 | 1.2 | 1.2 | 1.2 |
| Surfactant; fluorine surfactant KH40 (Seimi Chemicals; parts by weight) | 0.04 | 0.04 | 0.04 | 0.04 | 0.04 |

TABLE 2-continued

| Materials | Comp. Ex. 1 | Comp. Ex. 2 | Comp. Ex. 3 | Comp. Ex. 4 | Comp. Ex. 5 |
|---|---|---|---|---|---|
| 2-Butanone (parts by weight) | 60 | 60 | 60 | 60 | 60 |
| Ratio of (A1-A3 compounds)/(Rod-shaped liquid crystal compound) | 0.04 | — | — | 2.45 | 4.55 |
| Orientation uniformity | Bad | Bad | Bad | Bad | Bad |

In Tables 1 and 2, the "ratio of (A1-A3 compounds)/(rod-shaped liquid crystal compound)" indicates the value of (total weight of A1 to A3 compounds)/(total weight of rod-shaped liquid crystal compounds).

In Tables 1 and 2, the rod-shaped liquid crystal compounds and the A1 to A3 compounds indicate the followings.

Rod-shaped liquid crystal compound having Δn of 0.18: Asymmetric structure, two reactive groups per one molecule, molecular weight 600 or more.

Rod-shaped liquid crystal compound having Δn of 0.23: Asymmetric structure, two reactive groups per one molecule, molecular weight 600 or more.

Rod-shaped liquid crystal compound having Δn of 0.32: Asymmetric structure, two reactive groups per one molecule, molecular weight 600 or more.

A1 and A2 compounds: Each compound represented by the following formula (both exhibit liquid crystallinity.).

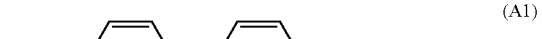

(A1)

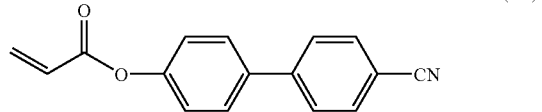

(A2)

A3 compound (S,S) isomer: Compound represented by the following formula (A3-1) (exhibiting the liquid crystallinity).

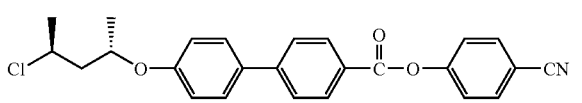

(A3-1)

A3 compound containing isomers: Mixture of the compound represented by the formula (A3-1) and the compound (R,R) isomer represented by the following formula (A3-2) at a weight ratio of 1:1 (exhibiting the liquid crystallinity).

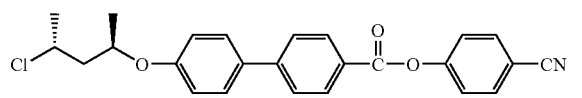

(A3-2)

Example 6

The transparent resin substrate having the orientation film to which the rubbing treatment had been given was prepared in the same manner as in Example 1 (1-1). The cholesteric liquid crystal composition having the same composition as in Example 4 was applied using the #10 wire bar onto the side having the orientation film of the transparent resin substrate. The orientation treatment at 100° C. for 5 minutes was given to the coating layer. Then the haze value was measured, and the haze value was 1.2%. It was confirmed that the orientation was uniform. Subsequently, a sequence of irradiating the weak ultraviolet light at 25 mJ/cm$^2$ and then treating with heat at 100° C. for one minute was repeatedly performed twice to the layer, and subsequently the ultraviolet light at 500 mJ/cm$^2$ was irradiated to the layer to produce a circular polarization separator sheet having a cured liquid crystal layer having a dry film thickness of 5 μm. The resulting circular polarization separator sheet had a haze value of 1.3% and kept the initial orientation uniformity.

Example 7

The transparent resin substrate having the orientation film to which the rubbing treatment had been given was prepared in the same manner as in Example 1 (1-1). Each cholesteric liquid crystal composition having the same composition as in Example 2, 4, 5 or Comparative Example 2 was applied using the #10 wire bar onto the side having the orientation film of this transparent resin substrate. The coating layer was heated at 100° C. using a thermal analysis apparatus (Hot Stage FPS2HT supplied from Mettler-Toledo KK), while the orientation state was observed under a polarization microscope (polarization microscope ECLIPSE E600-POL supplied from Nikon Corporation) to examine a time period until meshes of oily streak which was orientation defect derived from the cholesteric liquid crystal disappeared. The results are shown in Table 3. From the results shown in Table 3, it has been found that the time period until the orientation defect disappears is short and the uniform orientation can be obtained in a short time in the compositions of Examples.

TABLE 3

| Liquid crystal composition used | Time until the orientation defect disappears |
|---|---|
| Composition of Ex. 2 | 3 minutes |
| Composition of Ex. 4 | 1 minute |
| Composition of Ex. 5 | 2 minutes |
| Composition of Comp. Ex. 2 | Did not disappear at 10 minutes |

Examples 8 and 9, and Comparative Examples 6 and 7

A circular polarization separator sheet was produced in the same manner as in Example 1 except that the cholesteric liquid crystal composition having the composition shown in Table 4 was used. The hardness of a cured liquid crystal layer of the resulting circular polarization separator sheet was measured in terms of a pencil hardness in accordance with JIS K5400. The evaluation results are shown in Table 4. From the results in Table 4, it has turned out that by using the crosslinking agent, it is possible to enhance the surface hardness of the resulting circular polarization separator sheet while a good orientation uniformity is kept.

TABLE 4

| Materials | Ex. 8 | Ex. 9 | Comp. Ex. 6 | Comp. Ex. 7 |
|---|---|---|---|---|
| Rod-shaped liquid crystal compound having Δn of 0.18 (parts by weight) | — | — | — | — |
| Rod-shaped liquid crystal compound having Δn of 0.23 (parts by weight) | 27.4 | 24.6 | — | — |
| Rod-shaped liquid crystal compound having Δn of 0.32 (parts by weight) | — | — | — | — |
| Rod-shaped liquid crystal compound having Δn of 0.22 (parts by weight) | — | — | 28.5 | 24.6 |
| A1 compound (melting point 66° C.; parts by weight) | — | — | — | — |
| A2 compound (melting point 103° C.; parts by weight) | 9.2 | 8.2 | 8.1 | 8.2 |
| A3 compound ((S,S) isomer, melting point 104° C.; parts by weight) | — | — | — | — |
| A3 compound containing isomers (parts by weight) | — | — | — | — |
| Chiral agent LC756 (BASF; parts by weight) | 2.2 | 2.0 | 2.2 | 2.0 |
| DPHA (cross-linking agent; parts by weight) | — | 4.0 | — | 4.0 |
| Polymerization initiator Irgacure 907 (Ciba Specialty Chemicals; parts by weight) | 1.2 | 1.2 | 1.2 | 1.2 |
| Surfactant; fluorine surfactant KH40 (Seimi Chemicals; parts by weight) | 0.04 | 0.04 | 0.04 | 0.04 |
| 2-Butanone (parts by weight) | 60 | 60 | 60 | 60 |
| Ratio of (A1-A3 compounds)/(Rod-shaped liquid crystal compound) | 0.34 | 0.33 | 0.28 | 0.33 |
| Orientation uniformity | Good | Good | Good | Good |
| Pencil hardness | H | 2H | 2B | B |

In Table 4, DPHA represents dipentaerythritol hexaacrylate, and the rod-shaped liquid crystal compound having Δn of 0.22 is the compound having an asymmetric structure and one reactive group. Other items and abbreviation of the compound names are the same as those shown in Tables 1 and 2.

Example 10

(Production of Circular Polarization Separator Sheet)

The transparent resin substrate having the orientation film to which the rubbing treatment had been given was prepared in the same manner as in Example 1 (1-1). The cholesteric liquid crystal composition prepared by mixing the ingredient at mixing ratio shown in Table 5 was applied using the #10 wire bar onto the side having the orientation film of this transparent resin substrate. A process including the orientation treatment at 100° C. for 5 minutes, the irradiation of the weak ultraviolet light at 0.1 to 45 mJ/cm$^2$ and the subsequent heating treatment at 100° C. for one minute was repeatedly given twice to the coating layer. Subsequently, the ultraviolet light at 800 mJ/cm$^2$ was irradiated under the nitrogen atmosphere to produce a circular polarization separator sheet having a cholesteric liquid crystal layer having a dry film thickness of 5 μm.

(Evaluation of Circular Polarization Separator Sheets)

Transmission spectra of the film prepared in the aforementioned procedure were measured using a spectroscope (instantaneous multiple photometric system MCPD-3000 supplied from Otsuka Electronics Co., Ltd.) and the microscope (polarization microscope ECLIPSE E600-POL supplied from Nikon Corporation). Half value widths of selective reflection bandwidths are shown in Table 5.

The orientation uniformity was also evaluated in the same manner as in Example 1 (1-3). The results are shown in Table 5.

Examples 11 to 15

A circular polarization separator sheet was produced in the same manner as in Example 10 except that the cholesteric liquid crystal composition having the composition shown in Table 5 was used. The evaluation results are shown Table 5.

From the results in Examples 10 to 15, it has turned out that these circular polarization separator sheets have a good orientation uniformity and a wide selective reflection bandwidth which is as wide as 350 to 420 nm.

TABLE 5

| Materials | Ex. 10 | Ex. 11 | Ex. 12 | Ex. 13 | Ex. 14 | Ex. 15 |
|---|---|---|---|---|---|---|
| Rod-shaped liquid crystal compound having Δn of 0.23 (parts by weight) | 25.5 | 29.1 | 25.5 | 29.1 | 29.1 | 29.1 |
| A5 compound (liquid crystal, Δn 0.26, melting point 85° C.; parts by weight) | 11.0 | — | — | — | — | — |
| A6 compound (liquid crystal, Δn 0.25, melting point 118° C.; parts by weight) | — | 7.3 | — | — | — | — |
| A7 compound (liquid crystal, Δn 0.30, melting point 147° C.; parts by weight) | — | — | 11.0 | — | — | — |
| A8 compound (liquid crystal, Δn 0.26, melting point 87° C.; parts by weight) | — | — | — | 7.3 | — | — |
| A9 compound (liquid crystal, Δn 0.23, melting point 75° C.; parts by weight) | — | — | — | — | 7.3 | — |
| A10 compound, (non liquid crystal, melting point 87° C.; parts by weight) | — | — | — | — | — | 7.3 |
| Chiral agent LC756 (BASF; parts by weight) | 2.3 | 2.4 | 2.3 | 2.4 | 2.4 | 2.4 |
| Polymerization initiator Irgacure OXE02 (Ciba Specialty Chemicals; parts by weight) | 1.2 | 1.2 | 1.2 | 1.2 | 1.2 | 1.2 |

TABLE 5-continued

| Materials | Ex. 10 | Ex. 11 | Ex. 12 | Ex. 13 | Ex. 14 | Ex. 15 |
|---|---|---|---|---|---|---|
| Surfactant; fluorine surfactant KH40 (Seimi Chemicals; parts by weight) | 0.04 | 0.04 | 0.04 | 0.04 | 0.04 | 0.04 |
| 2-Butanone (parts by weight) | 15 | 15 | 15 | 30 | 15 | 30 |
| Cyclopentanone (parts by weight) | 45 | 45 | 45 | 30 | 45 | 30 |
| Ratio of (A5-A10 compounds)/ (Rod-shaped liquid crystal compound) | 0.43 | 0.25 | 0.43 | 0.25 | 0.25 | 0.25 |
| Orientation uniformity | Good | Good | Good | Good | Good | Good |
| Half value width of the selective reflection bandwidths (nm) | 400 | 370 | 420 | 380 | 350 | 380 |

In Table 5, Δn values of the compounds of A5 to A10 indicate the values obtained by extrapolation on the basis of the Δn values of the compositions obtained by mixing the rod-shaped liquid crystal compound having Δn of 0.23 and the compound of A5 to A10 at the weight ratio of 80:20. in Table 5, the rod-shaped liquid crystal compound having Δn of 0.23 and the compounds of A5 to A10 indicate the followings.

Rod-shaped liquid crystal compound having Δn of 0.23: Asymmetric structure, two reactive groups per one molecule.

Compounds of A5 to A10: Compounds represented by the following formulae (all exhibit the liquid crystallinity).

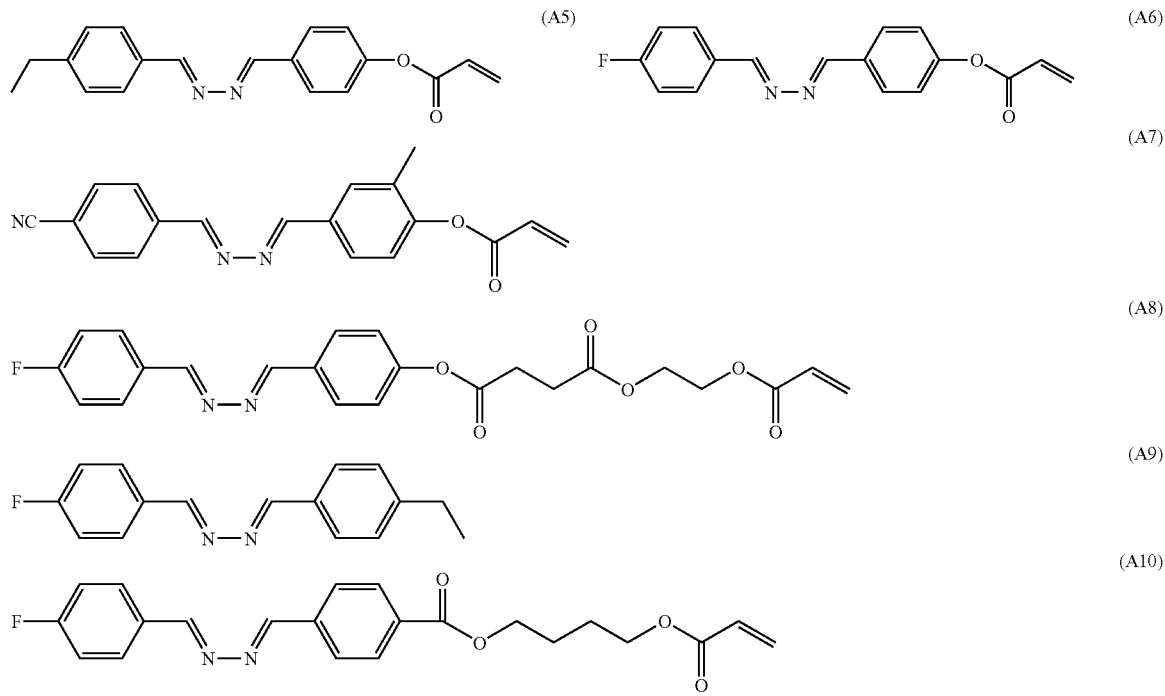

Examples 16 to 21

(Preparation of Phase Shift Film)

A monomer composition composed of 97.8% by weight of methyl methacrylate and 2.2% by weight of methyl acrylate was polymerized by bulk polymerization to yield resin pellets.

Rubber particles were produced in accordance with Example 3 in JP Sho-55-27576-B Publication. This rubber particle has a spherical three layer structure. The core internal layer is composed of a crosslinked polymer of methyl methacrylate and a small amount of allyl methacrylate, the internal layer is composed of a soft elastic copolymer obtained by crosslinking copolymerizing butyl acrylate and styrene as major components with a small amount of ally acrylate, and the external layer is composed of a hard polymer of methyl methacrylate and a small amount of ethyl acrylate. The average particle diameter of the internal layer was 0.19 μm, and the particle diameter including the external layer was 0.22 μm.

Subsequently, 70 parts by weight of the resin pellets and 30 parts by weight of the rubber particles were mixed, and the mixture was melted and kneaded using a biaxial extruder to yield a methacrylate ester polymer composition A (glass transition temperature: 105° C.).

The methacrylate ester polymer composition A (layer b) and a styrene-maleic acid anhydrate copolymer (glass transition temperature: 130° C.) (layer a) were co-extruded and molded at 280° C. to yield a multilayer film having a three layer structure of (layer b)/(layer a)/(layer b) having average thickness of each layer being 45/70/45 μm. This laminated film was stretched obliquely using a tenter stretching machine at a stretching temperature of 134° C. at a stretching ratio of 1.8 times so that a slow axis was at the direction which was inclined at 45 degrees with respect to an MD direction, to yield an optically anisotropic layer.

The optically anisotropic layer had retardation in the front direction of 140 nm and the retardation in the thickness direction of −85 nm (each value is the valued measured after being stretched). The corona discharge treatment was given to one side of this optically anisotropic layer so that a wetting index was 56 dyne/cm. This optically anisotropic layer was used below as a phase shift film.

(Preparation of Brightness Enhancement Film)

Each of the circular polarization separator sheets obtained in Examples 10 to 15 and the phase shift film obtained in the aforementioned procedure were laminated and integrated via an adhesive agent to produce each of brightness enhancement films (2-1) to (2-6).

The adhesive agent therefor was prepared as follows: firstly an adhesive agent composition composed of 40 parts by weight of ethylene-vinyl acetate copolymer emulsion (nonvolatile portion: 40% by weight, content of vinyl acetate: 40% by weight), 35 parts by weight of petroleum resin emulsion (nonvolatile portion: 40% by weight, resin softening point: 85° C.) and 10 parts by weight of paraffin wax emulsion (nonvolatile portion: 40% by weight, resin softening point: 64° C.) and having a shearing storage elastic modulus of 10 MPa at 23° C. was prepared. Then, microparticles having a diameter of 4 μm (shape: spherical, material: polystyrene, refraction index: 1.59) were mixed with this adhesive agent composition so that the haze value of the mixture was 70% (measured in accordance with JIS K7136 using a haze guard II supplied from Toyo Seiki Kogyo Co., Ltd.). This mixture was used as the adhesive agent. This adhesive agent was applied onto the cured liquid crystal layer of the circular polarization separator sheet so that the average thickness was 20 Mm, and this side was laminated with the phase shift film facing the side treated with the corona treatment, using a laminator at 80° C. and at a nip pressure of 2 kgf/50 mm, to obtain the brightness enhancement film (2-1) to (2-6).

(Liquid Crystal Display Device)

A commercially available liquid crystal display device (Aquos LC-37BE1W supplied from Sharp Corporation) was decomposed, and then assembled again. Upon assembling, each brightness enhancement film of (2-1) to (2-6) was incorporated. Then, a white image was displayed on the liquid crystal display device, and the luminance in the front direction (front luminance) was measured using a view angle measurement evaluation apparatus (brand name: ErgoScope supplied from Autronic-MELCHERS). The liquid crystal display device is composed of backlight units, a diffusion plate, a diffusion sheet, a prism sheet, an optical complex element and the liquid crystal panel in this order.

The front luminance when each of the brightness enhancement films (2-1) to (2-6) was mounted was shown in Table 6 as a relative value with respect to the front luminance without the brightness enhancement film being 1.

Glaring and color unevenness were visually evaluated in the state wherein the brightness enhancement film was mounted. As to the glaring, when a precipitous luminance change which occurs upon changing the observation angle was eliminated, that case was evaluated as "good". The case in which such a change was not eliminated was evaluated as "poor". As to the color unevenness, when the unevenness was not observed, that case was evaluated as "good". When the unevenness was observed but at a slight leven, that case was evaluated as "moderate". When the unevenness was observed and quality of image was remarkably deteriorated, that case was evaluated as "poor".

Comparative Example 8

A brightness enhancement film (3-1) was prepared in the same manner as in the aforementioned Example 16 except that the circular polarization separator sheet was replaced with the circular polarization separator sheet of Comparative Example 6.

It is evident from the results of Examples 16 to 21 and Comparative Example 8 that the liquid crystal display having the brightness enhancement film including the circular polarization separator sheet of the present invention had a high front direction luminance and a reduced glaring and color unevenness.

TABLE 6

|  | Ex. 16 | Ex. 17 | Ex. 18 | Ex. 19 | Ex. 20 | Ex. 21 | Comp. Ex. 8 |
|---|---|---|---|---|---|---|---|
| Front luminance | 1.34 | 1.33 | 1.34 | 1.33 | 1.32 | 1.34 | 1.20 |
| Glaring | Good | Good | Good | Good | Good | Good | Bad |
| Color unevenness | Good | Good | Good | Good | Good | Good | Bad |

The invention claimed is:

1. A cholesteric liquid crystal composition containing at least one compound represented by the following general formula (1):

$$R^1\text{-}A^1\text{-}B\text{-}A^2\text{-}R^2 \quad (1),$$

wherein $R^1$ and $R^2$ each independently represent a group selected from the group consisting of a straight or branched alkyl group having 1 to 20 carbon atoms, which may be unsubstituted or substituted with one or more halogen atoms; a straight or branched alkylene oxide group having 1 to 20 carbon atoms, which may be unsubstituted or substituted with one or more halogen atoms; a hydrogen atom; a halogen atom, a hydroxyl group, a carboxyl group, a (meth)acryl group, an epoxy group, a mercapto group, an isocyanate group, an amino group and a cyano group, which may be bound to an alkyl or alkylene oxide group having 1 to 2 carbon atoms; $A^1$ and $A^2$ each independently represent a group selected from the group consisting of 1,4-phenylene group, 1,4-cyclohexylene group, 1,4-cyclohexenyl group, 4,4'-biphenylene group, 4,4'-bicyclohexylene group and 2,6-naphthylene group, which may be unsubstituted or substituted with one or more halogen atoms, hydroxyl groups, carboxyl groups, cyano groups, amino groups, and alkyl or halogenated alkyl groups having 1 to 10 carbon atoms; and B is selected from the group consisting of a single bond, —O—, —S—, —S—S—, —CO—, —CS—, —OCO—, —CH$_2$—, —OCH$_2$—, —CH═N—N═CH—, —NHCO—, —OCOO—, —CH$_2$COO— and —CH$_2$OCO—; wherein said compound represented by the general formula (1) has a molecular weight of less than 600, and at least one rod-shaped liquid crystal compound having an intrinsic birefringence Δn of 0.18 or more and at least two reactive groups per one molecule, and having a molecular weight of 600 or more, wherein a ratio of a total weight of said compound of the general formula (1) to a total weight of said rod-shaped liquid crystal compound [(total weight of said compound of the general formula (1))/(total weight of said rod-shaped liquid crystal compound)] is 0.05 to 1.

2. The cholesteric liquid crystal composition according to claim 1 wherein at least one of said compounds of the general formula (1) has a liquid crystallinity.

3. The cholesteric liquid crystal composition according to claim 1 wherein at least one of said compounds of the general formula (1) has a chirality.

4. The cholesteric liquid crystal composition according to claim 1 wherein at least one of said compounds of the general formula (1) has an optical property and said composition contains a mixture of a plurality of optical isomers thereof.

5. The cholesteric liquid crystal composition according to claim 1 wherein at least one of said compounds of the general formula (1) has a melting point of 50 to 150° C.

6. The cholesteric liquid crystal composition according to claim 1 wherein at least one of said rod-shaped liquid crystal compounds has an asymmetric structure.

7. A circular polarization separator sheet obtained by applying the cholesteric liquid crystal composition according to claim 1 on a transparent resin substrate and curing said composition.

8. A method for producing a circular polarization separator sheet comprising a step of applying the cholesteric liquid crystal composition according to claim 1 on a transparent resin substrate to obtain a liquid crystal layer and a step of curing said liquid crystal layer by at least one step of light irradiation and/or heating treatment.

9. A brightness enhancement film comprising the circular polarization separator sheet according to claim 7 and a phase shift film.

10. A liquid crystal display device comprising the brightness enhancement film according to claim 9 and a liquid crystal panel.

11. The cholesteric liquid crystal composition according to claim 1 wherein the reactive group is at least one selected from the group consisting of an epoxy group, a thioepoxy group, an oxetanyl group, a thietanyl group, an aziridinyl group, a pyrrol group, a fumarate group, a cinnamoyl group, an isocyanate group, an isothiocyanate group, an amino group, a hydroxyl group, a carboxyl group, an alkoxysilyl group, an oxazoline group, a mercapto group, a methacryl group and an acryl group.

* * * * *